(12) United States Patent
Laguna Rueda et al.

(10) Patent No.: US 11,403,274 B1
(45) Date of Patent: Aug. 2, 2022

(54) EFFICIENT CREATION AND/OR RESTATEMENT OF DATABASE TABLES

(71) Applicant: Microsoft Technology Licensing, LLC, Redmond, WA (US)

(72) Inventors: Carlos Abraham Laguna Rueda, Bellevue, WA (US); Alexei Boudzko, Bellevue, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

(21) Appl. No.: 17/156,481

(22) Filed: Jan. 22, 2021

(51) Int. Cl.
 *G06F 16/22* (2019.01)
 *G06F 11/14* (2006.01)
 *G06F 16/28* (2019.01)

(52) U.S. Cl.
 CPC ...... *G06F 16/2282* (2019.01); *G06F 11/1469* (2013.01); *G06F 16/2264* (2019.01); *G06F 16/285* (2019.01); *G06F 2201/84* (2013.01)

(58) Field of Classification Search
 CPC ............. G06F 11/1469; G06F 11/1446; G06F 16/2329; G06F 16/2282; G06F 16/2264; G06F 16/283; G06F 16/219; G06F 16/23; G06F 16/2365; G06F 16/285; G06F 2201/84
 See application file for complete search history.

(56) References Cited

U.S. PATENT DOCUMENTS

| | | | |
|---|---|---|---|
| 6,189,004 B1* | 2/2001 | Rassen | G06F 16/283 707/999.102 |
| 7,461,076 B1* | 12/2008 | Weissman | G06F 16/284 707/999.102 |
| 7,739,224 B1* | 6/2010 | Weissman | G06F 16/283 709/201 |
| 8,918,388 B1* | 12/2014 | Chen | G06F 16/283 707/715 |
| 9,031,902 B2 | 5/2015 | Bhide et al. | |
| 9,715,538 B2* | 7/2017 | Bigus | G06F 16/2282 |
| 9,886,460 B2 | 2/2018 | Cushing et al. | |

(Continued)

OTHER PUBLICATIONS

Liu, Feng, "Merge Multiple SCD Tables into a Single Dimension", Retrieved from: https://blogs.sap.com/2018/11/22/merge-multiple-scd-tables-into-a-single-dimension/, Nov. 22, 2018, 15 Pages.

(Continued)

*Primary Examiner* — Merilyn P Nguyen
(74) *Attorney, Agent, or Firm* — Schwegman Lundberg & Woessner, P.A.

(57) ABSTRACT

Techniques for rebuilding at least a portion of a SCD table in a database based on a set of snapshots individually containing a current value of a variable corresponding to a dimension in the table are discloses herein. In one example, a method includes grouping the snapshots in the set into multiple pairs of snapshots and concurrently generating multiple first table segments individually from a corresponding one of the multiple pairs of snapshots in the set. The method also includes grouping the generated multiple first table segments into multiple pairs of the first table segments and concurrently merging the multiple pairs of first table segments individually into a second table segment. The grouping and concurrently merging operations can be repeated until only one table segment is present.

20 Claims, 4 Drawing Sheets

(56) References Cited

U.S. PATENT DOCUMENTS

| | | | |
|---|---|---|---|
| 2006/0253414 A1* | 11/2006 | Mittal | G06F 16/283 |
| 2007/0203892 A1 | 8/2007 | Adams et al. | |
| 2008/0306907 A1 | 12/2008 | Biswal et al. | |
| 2014/0279977 A1* | 9/2014 | Milousheff | G06F 16/219 |
| | | | 707/695 |
| 2017/0060449 A1 | 3/2017 | Zucca et al. | |
| 2017/0185642 A1 | 6/2017 | Faerber et al. | |
| 2021/0042279 A1* | 2/2021 | Ejsing | G06F 16/219 |

OTHER PUBLICATIONS

Pious, Aldrin, "Building ETL and SCD with Snowflake Streams & Tasks", Retrieved from: https://saamaanalytics.com/blogs/building-etl-and-scd-with-snowflake-streams-tasks/, Apr. 17, 2020, 19 Pages.

Shanklin, Carter, "Update Hive Tables the Easy Way Part 2", Retrieved from: https://blog.cloudera.com/update-hive-tables-easy-way-2/, Aug. 23, 2017, 11 Pages.

Snider, Dallas, "Using the SQL Server MERGE Statement to Process Type 2 Slowly Changing Dimensions", Retrieved from: https://web.archive.org/web/20200929120019/https:/www.mssqltips.com/sqlservertip/2883/using-the-sql-server-merge-statement-to-process-type-2-slowly-changing-dimensions/, Sep. 29, 2020, 8 Pages.

Finis, et al., "DeltaNI: An Efficient Labeling Scheme for Versioned Hierarchical Data", In Proceedings of the 2013 ACM SIGMOD International Conference on Management of Data, Jun. 22, 2013, pp. 905-916.

"International Search Report and Written Opinion Issued in PCT Application No. PCT/US21/062729", dated Mar. 17, 2022, 11 Pages.

* cited by examiner

US 11,403,274 B1

EFFICIENT CREATION AND/OR RESTATEMENT OF DATABASE TABLES

BACKGROUND

In computing, a data warehouse is a core component of business intelligence useful for business reporting and data analysis. A data warehouse can include databases that contain relatively static data that changes slowly but unpredictably. For example, a database can include a table of Slowly Changing Dimensions (SCD) for storing current and historical records of employees in a company. The SCD table can be organized along various dimensions such as identifies of employees, corresponding regional offices the employees work at, and other related information. Sometimes, an employee can be transferred from one regional office to another. For reporting purposes, the database can store a record in the SCD table indicating that the employee initially worked at a first regional office but later transferred to a second regional office.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Typically, a table builder can construct a SCD table in a sequential manner based on a series of samplings of a current state or value ("snapshots") in one or more dimensions of the SCD table. For instance, in the employee example above, the table builder can receive a first snapshot indicating that an employee (e.g., "John Smith") started working at a first regional office (e.g., Seattle) at an initial date (e.g., Jun. 4, 2019). In response, the table builder can be configured to generate a first record in the SCD table having a start date of the initial date and an end date of null indicating a last known value, as follows:

| Employee   | Regional Office | Start Date   | End Date |
|------------|-----------------|--------------|----------|
| John Smith | Seattle         | Jun. 4, 2019 | (null)   |

Subsequently, one or more additional snapshots regarding the employee's regional office can be received. In response, the table builder can determine whether the additional snapshots include a change in the regional office associated with the employee that is not in the current SCD table. For instance, a second snapshot can indicate that "John Smith" still works at the Seattle office on Aug. 2, 2019. Because the value of the regional office dimension has not changed, the table builder can maintain the current SCD table without modification of the first record.

On the other hand, the table builder can be configured to modify existing records and/or create new records in the SCD table when an additional snapshot includes a change in the reginal office dimension. For instance, a third snapshot can be received to indicate that the employee is transferred to a second regional office (e.g., Chicago) at a transfer date (e.g., Dec. 31, 2019). In response, the table builder can modify the end date of the first record from null to the transfer date and create a second record having a start date that is the transfer date and an end date of null indicating a last known value, as follows:

| Employee   | Regional Office | Start Date    | End Date      |
|------------|-----------------|---------------|---------------|
| John Smith | Seattle         | Jun. 4, 2019  | Dec. 31, 2019 |
| John Smith | Chicago         | Dec. 31, 2019 | (null)        |

Additional snapshots regarding the regional office information of the employee can be similarly tracked and recorded by modifying the last record (e.g., the second record), adding additional records, or via other manipulation techniques of the SCD table. As such, the table builder can build the SCD table to track historical and current information regarding the regional office the employee works at in the company.

The sequential technique described above is generally stable and robust to process a series of incoming snapshots. However, the sequential technique can be slow and inefficient when recreating a SCD table or a portion thereof (commonly referred to as a "restatement"). A SCD table or a portion thereof may be recreated for various reasons. For example, one or more snapshots previously used to build the SCD table may contain erroneous information. In another example, one or more snapshots may have been skipped when initially building the SCD table, and thus rendering information contained in the SCD table invalid. In further examples, the SCD table may be corrupted or otherwise become incorrect and/or unusable. Under such scenarios, the table builder can rebuild at least a portion of the SCD table using stored, corrected, and/or new snapshots. However, sequentially processing large numbers of snapshots can be resource intensive, inefficient, and slow because the snapshots are processed one at a time.

Several embodiments of the disclosed technology are directed to a table builder that can efficiently create or rebuild tables (e.g., SCD tables) by implementing a merge-update technique on a set of snapshots. In certain implementations, the table builder can be configured to divide the set of snapshots into individual snapshot pairs and convert the snapshots in the pairs into individual database records. The table builder can then merge the database records corresponding to the individual snapshot pairs to generate a table segment generally concurrently, in an interleaved manner, or in other suitable manners. As such, the table segment can individually include merged information from a corresponding pair of the snapshots in the set.

The table builder can be configured to then determine whether multiple table segments are present. In response to determining that only one table segment is present, the table builder can be configured to indicate that a rebuild is complete. The table builder can then further merge the table segment to other portions of the SCD table to complete the restatement. On the other hand, in response to determining that multiple table segments are present after the merge, the table builder can be configured to pair the table segment and merge the pairs of the table segment into a new level of table segment(s) generally concurrently, in an interleaved manner, or in other suitable manners.

The table builder can be configured to then determine whether the new level of table segments is more than one. In response to determining that the new level has only one table segment, the table builder can be configured to indicate that a rebuild is complete. On the other hand, in response to determining that the new level of table segments is more than one, the table builder can be configured to pair the new level of table segments and further merge pairs of the new level of table segments into additional level(s) of table segments. The foregoing operations can be repeated until only one overall table segment is obtained. As such, the original snapshots and one or more levels of table segment can form a logic tree with multiple levels of merge processing until a "root," e.g., the overall table segment, is reached.

The table builder can thus perform the creation and/or restatement process of the SCD table faster than others that perform the restatement in a sequential manner. By pairing the snapshots and table segments and merge the pairs thereof, the table builder can be configured to process multiple snapshots and table segments generally concurrently. As such, multiple table segments can be processed at the same time, and thus significantly shortening time of restating the SCD table and allowing fully utilizing compute power of one or more processors executing the table builder. In addition, processing multiple snapshots/table segments at the same time can also reduce amount of network, storage, and other suitable types of resources consumed by the table builder executing on one or more servers.

DETAILED DESCRIPTION

Figure 1:
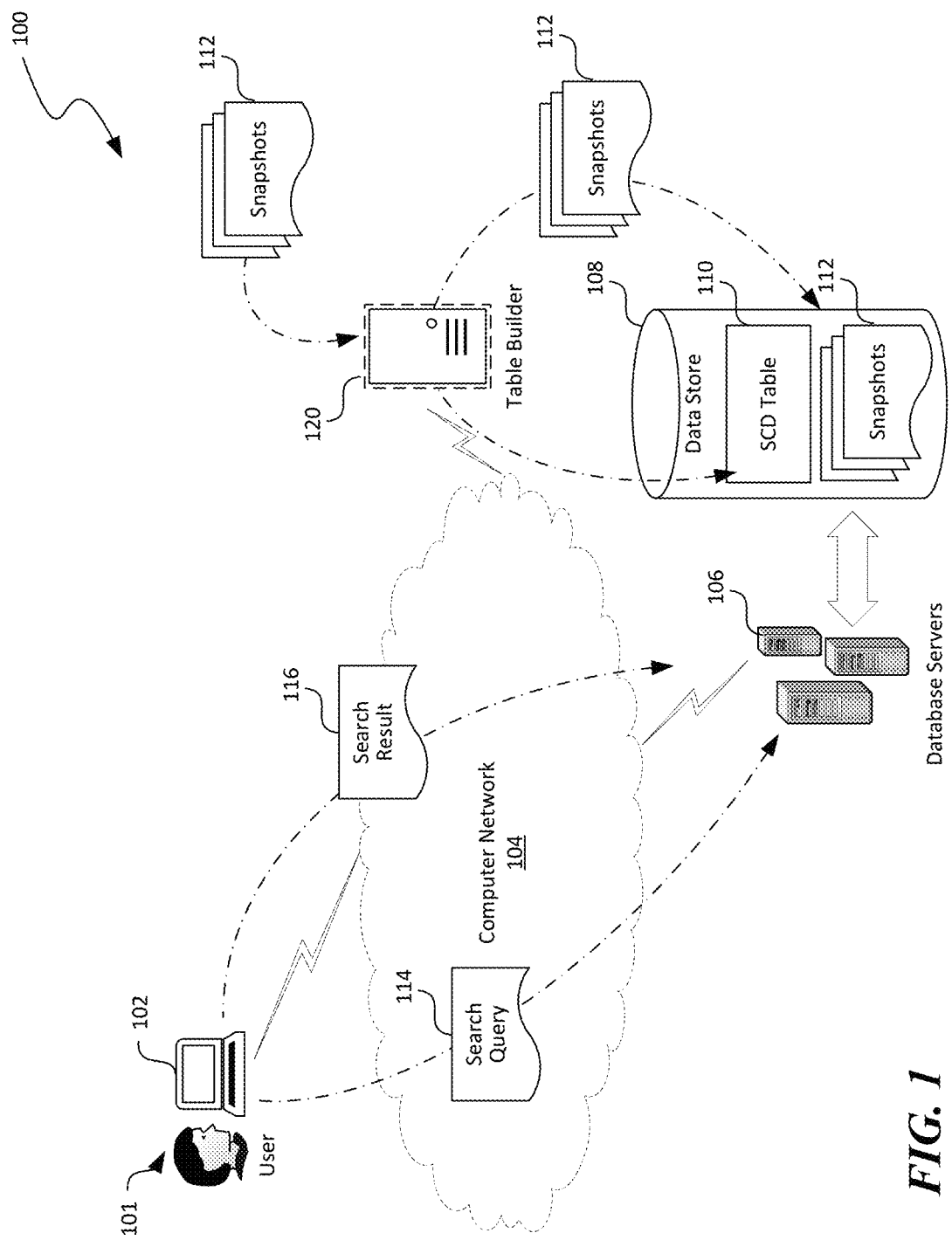
FIG. 1 is a schematic diagram illustrating a computing system implementing efficient creation and/or restatement of database tables in accordance with embodiments of the disclosed technology.

Certain embodiments of systems, devices, components, modules, routines, data structures, and processes for efficient creation and/or restatement of database tables in computing systems are described below. In the following description, specific details of components are included to provide a thorough understanding of certain embodiments of the disclosed technology. A person skilled in the relevant art will also understand that the technology can have additional embodiments. The technology can also be practiced without several of the details of the embodiments described below with reference to FIGS. 1-5.

In the following description, a database table or table is a collection of related data held in a table format within a database. A table can include one or more columns and rows. In certain implementations, each column can represent a variable or dimension of the table. For instance, in the employee example above, a first dimension or column can include data of employee names while a second dimension or column can include data of a regional office employees work at. Each row can thus include a database record having values along various dimensions of the table. For instance, a database record can include a row of data along example dimensions as follows:

| Employee | Regional Office | Start Date | End Date |
|---|---|---|---|
| John Smith | Seattle | Jun. 4, 2019 | (null) |

Also, in the following description, a snapshot or snap represents values of various dimensions in a table at a point in time. For instance, a snapshot can indicate that an employee (e.g., "John Smith") works at Seattle office on Jun. 4, 2019. Based on the snapshot, a table builder can convert the snapshot into the example database record shown above. In other implementations, tables can be arranged with rows representing dimensions and columns representing database records, or in other suitable organizations.

Also, a table can be configured to store data of Slowly Changing Dimensions (SCD) that can change slowly but unpredictably. Such a table can be referred to as A SCD table. For instance, in the example described in the Summary Section, A SCD table can be configured along various dimensions such as identifies of employees, corresponding regional offices the employees work at, and other related information. The various dimensions can correspond to respective variables such as reginal offices that can change slowly but unpredictably.

Building a table from snapshots is typically performed in a sequential manner. As additional snapshots are received, a table builder can be configured to determine whether to modify existing database records, create new database records, or perform other suitable operations. Though sequentially processing snapshots is typically stable and robust, processing a large set of snapshots can be slow and resource intensive when rebuilding or restating at least a portion of A SCD table because each snapshot in the set is processed one at a time. A SCD table or a portion thereof may be recreated for various reasons. For example, one or more snapshots previously used to build the SCD table may contain erroneous information. In another example, one or more snapshots may have been skipped when initially building the SCD table, and thus rendering information contained in the SCD table invalid. In further examples, the SCD table may be corrupted or otherwise become incorrect and/or unusable. Under such scenarios, the table builder can rebuild at least a portion of the SCD table (referred to as a restatement) using stored, corrected, and/or new snapshots. However, sequentially processing large numbers of snapshots can be resource intensive, inefficient, and slow because the snapshots are processed one at a time.

Several embodiments of the disclosed technology are directed to a table builder that can efficiently create or rebuild tables (e.g., SCD tables) by implementing a merge-update technique on a set of snapshots. In certain implementations, database records corresponding to each snapshot can be subdivided into pairs, triplets, or subsets with other suitable numbers of members. The table builder can then merge the subsets of database records into table segments in generally concurrent, interleaved, or other overlapping manner. As such, multiple snapshots and corresponding database records may be processed at the same time. The subdivision and merge technique can then be repeated until there is only one overall table segment. As such, creating or restating a table can be performed much faster than processing the snapshots sequentially, as described in more detail below with reference to FIGS. 1-5.

FIG. 1 is a schematic diagram illustrating an example computing system 100 implementing efficient creation and/or restatement of database tables in accordance with embodiments of the disclosed technology. As shown in FIG.

1, the computing system 100 can include a computer network 104 interconnecting a client device 102, database servers 106, and a table builder 120. The database servers 106 can be interconnected with a data store 108 containing A SCD table 110 and a set of snapshots 112. Though particular components of the computing system 100 is shown in FIG. 1 for illustration purposes, in other implementations, the computing system 100 can also include web servers, network storage devices, and/or other suitable components in addition to or in lieu of those shown in FIG. 1.

The computer network 104 can include an intranet, a wide area network, the Internet, or other suitable types of network. The client devices 102 can include a desktop, laptop, smartphone, or other suitable types of computing device that is configured to facilitate a user 101 to access computing services provided by the database servers 106 via the computer network 104. For example, in the illustrated embodiment, the user 101 can utilize the client device 102 to submit a search query 114 for current and/or historical information regarding regional offices employees of a company work at. In response, the database servers 106 can be configured to query the SCD table 110 in the data store 108 based on the submitted search query 114 and locate one or more database records from the SCD table 110 to transmit to the client device 102 via the computer network 104. Though only one user 101 is shown in FIG. 1, in other embodiments, the computing system 100 can include two, three, or any other suitable number of users 101.

As shown in FIG. 1, the computing system 100 can include a table builder 120 that is configured to construct, modify, and maintain the SCD table 110 in the data store 108. In the illustrated embodiment, the table builder 120 can be a standalone entity in the computing system 100. For example, the table builder 120 can include one or more servers (not shown) individually configured to execute suitable instructions to provide the table builder 120. In other embodiments, the table builder 120 can be a component at the database servers 106. In further embodiments, the table builder 120 can be configured as a computing service provided by a facility (e.g., a datacenter) external to the computing system 100.

In certain embodiments, the table builder 120 can be configured to receive one or more snapshots 112 from other servers (not shown) in the computing system 100, administrators of the computing system 100, or other suitable sources. The table builder 120 can be configured to process the received snapshots 112 and update and/or maintain the SCD table 110 accordingly as well as store at least some of the received snapshots 112 in the data store 108. For instance, in the employee example above, the table builder 120 can receive a first snapshot 112 indicating that an employee (e.g., "John Smith") started working at a first regional office (e.g., Seattle) at an initial date (e.g., Jun. 4, 2019). In response, the table builder 120 can be configured to generate a first record in the SCD table 110 having a start date of the initial date and an end date of null indicating a last known value, as follows:

| Employee | Regional Office | Start Date | End Date |
|---|---|---|---|
| John Smith | Seattle | Jun. 4, 2019 | (null) |

Subsequently, one or more additional snapshots 112 regarding the employee's regional office can be received. In response, the table builder 120 can determine whether the additional snapshots 112 include a change in the regional office associated with the employee that is not in the current SCD table 110. For instance, a second snapshot 112 can indicate that "John Smith" still works at the Seattle office on Aug. 2, 2019. Because the value of the regional office dimension has not changed, the table builder 120 can maintain the current SCD table 110 without modification of the first record.

On the other hand, the table builder 120 can be configured to modify existing records and/or create new records in the SCD table 110 when an additional snapshot 112 includes a change in the reginal office dimension. For instance, a third snapshot 112 can be received to indicate that the employee is transferred to a second regional office (e.g., Chicago) at a transfer date (e.g., Dec. 31, 2019). In response, the table builder 120 can modify the end date of the first record from null to the transfer date and create a second record having a start date that is the transfer date and an end date of null indicating a last known value, as follows:

| Employee | Regional Office | Start Date | End Date |
|---|---|---|---|
| John Smith | Seattle | Jun. 4, 2019 | Dec. 31, 2019 |
| John Smith | Chicago | Dec. 31, 2019 | (null) |

Additional snapshots 112 regarding the regional office information of the employee can be similarly tracked and recorded by modifying the last record (e.g., the second record), adding additional records, as described above, or via other manipulation of the SCD table 110. As such, the table builder 120 can build the SCD table 110 to track historical and current information regarding the regional office the employee works at in the company. The database servers 106 can then query the SCD table 110 for certain historical and current information in response to the search query 114 and provide the search result 116 to the user 101, as described above.

It has been recognized that the SCD table 110 or a portion thereof may be recreated for various reasons. For example, one or more snapshots 112 previously used to build the SCD table 110 may contain erroneous information. In another example, one or more snapshots 112 may have been skipped when initially building the SCD table 110, and thus rendering information contained in the SCD table 110 invalid. In further examples, the SCD table 110 may be corrupted or otherwise become incorrect and/or unusable. Under such scenarios, the table builder 120 can rebuild at least a portion of the SCD table 110 using stored, corrected, and/or new snapshots 112. However, sequentially processing large numbers of snapshots 112 can be resource intensive, inefficient, and slow because the snapshots are processed one at a time. In accordance with several embodiments of the disclosed technology, the table builder 120 can be configured to efficiently rebuild at least a portion of the SCD table 110 by implementing a merge-update technique, as described in more detail below with reference to FIG. 2.

Figure 2:
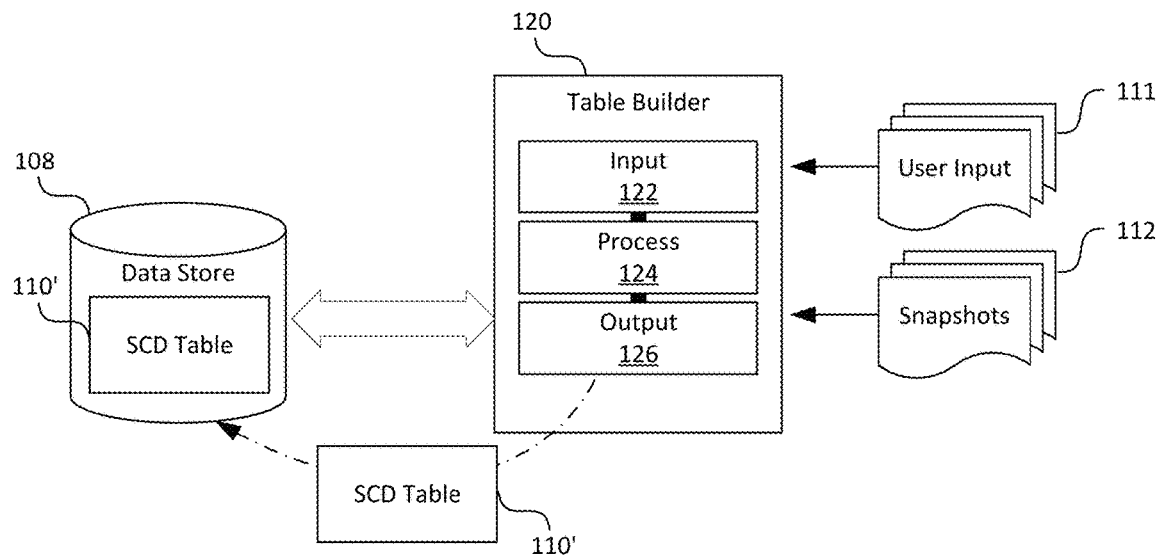
FIG. 2 is a schematic diagram illustrating certain example hardware/software components of a table builder suitable for the computing system of FIG. 1 in accordance with embodiments of the disclosed technology.

FIG. 2 is a schematic diagram illustrating certain example hardware/software components of the table builder 120 in accordance with embodiments of the disclosed technology. In FIG. 2, only certain components of the computing system 100 of FIG. 1 are shown for clarity. In FIG. 2 and in other Figures herein, individual software components, objects, classes, modules, and routines may be a computer program, procedure, or process written as source code in C, C++, C#, Java, and/or other suitable programming languages. A component may include, without limitation, one or more modules, objects, classes, routines, properties, processes, threads, executables, libraries, or other components. Components may be in source or binary form. Components may include aspects of source code before compilation (e.g., classes, properties, procedures, routines), compiled binary units (e.g., libraries, executables), or artifacts instantiated and used at runtime (e.g., objects, processes, threads).

Components within a system may take different forms within the system. As one example, a system comprising a first component, a second component and a third component can, without limitation, encompass a system that has the first component being a property in source code, the second component being a binary compiled library, and the third component being a thread created at runtime. The computer program, procedure, or process may be compiled into object, intermediate, or machine code and presented for execution by one or more processors of a personal computer, a network server, a laptop computer, a smartphone, and/or other suitable computing devices.

Equally, components may include hardware circuitry. A person of ordinary skill in the art would recognize that hardware may be considered fossilized software, and software may be considered liquefied hardware. As just one example, software instructions in a component may be burned to a Programmable Logic Array circuit or may be designed as a hardware circuit with appropriate integrated circuits. Equally, hardware may be emulated by software. Various implementations of source, intermediate, and/or object code and associated data may be stored in a computer memory that includes read-only memory, random-access memory, magnetic disk storage media, optical storage media, flash memory devices, and/or other suitable computer readable storage media excluding propagated signals.

As shown in FIG. 2, the table builder 120 can include an input component 122, a process component 124, and an output component 126. Though particular components of the table builder 120 are shown in FIG. 2, in other embodiments, the table builder 120 can also include calculation, network, or other suitable types of components.

The input component 122 can be configured to receive or retrieve snapshots 112 from, for example, the data store 108. The input component 122 can also be configured to receive user input 111 specifying, for instance, whether the SCD table 110 is to be completely rebuilt or only a portion of the SCD table is to be rebuilt. Based on the received user input 111, the input component 122 can be configured to filter, sort, or otherwise process the received snapshots 112. The input component 122 can then forward the processed snapshots 112 to the process component 124 for further processing.

The process component 124 can be configured to construct at least a portion of the SCD table 110 based on the received snapshots 112 by applying a merge-update technique. As such, multiple snapshots 112 may be processed generally concurrently, in an interleaved, or other overlapping fashion. Example operations performed by the process component 124 are described in more detail below with reference to FIG. 3. Upon completion of rebuilding at least a portion of the SCD table 110 by the process component 124, the output component 126 can be configured to store the rebuilt SCD table 110' in the data store 108 or merge at least a portion of the rebuilt SCD table 110 with other portions of the SCD table 110 to generate an updated SCD table 110'.

Figure 3:
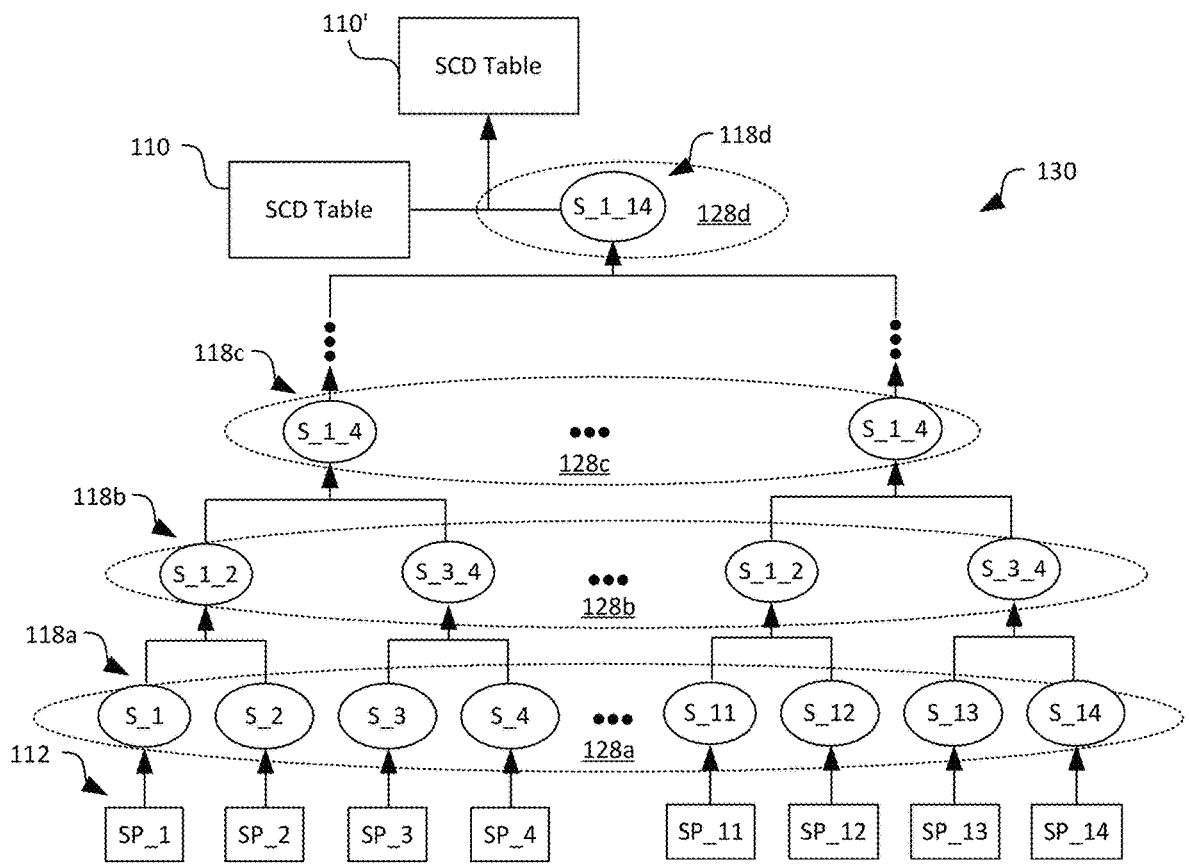
FIG. 3 is a schematic diagram illustrating an example logic tree formed by implementing a merge/update technique in accordance with embodiments of the disclosed technology.

FIG. 3 is a schematic diagram illustrating an example logic tree 130 formed by implementing a merge/update technique suitable for the process component 124 of the table builder 120 in FIG. 3 in accordance with embodiments of the disclosed technology. In the illustrated example, fourteen snapshots 112 (shown as "SP_1" to "SP_14") are shown for illustration purposes. In other examples, the merge-update technique can be applied to any suitable numbers of snapshots 112.

As shown in FIG. 3, the process component 124 (FIG. 2) of the table builder 120 (FIG. 2) can be configured to initially convert the snapshots 112 into corresponding database records 118a (shown as "S_1" to "S_14") at a first level 128a of the logic tree 130. For example, the table builder 120 can convert a snapshot 112 indicating that an employee (e.g., "John Smith") started working at a first regional office (e.g., Seattle) at an initial date (e.g., Jun. 4, 2019) into a database record 118a (e.g., S_1), as follows:

| Employee | Regional Office | Start Date | End Date |
|---|---|---|---|
| John Smith | Seattle | Jun. 4, 2019 | (null) |

The process component 124 can then be configured to determine whether there are more than one database record 118a to be processed. In response to determining that there is only one database record 118a, the process component 124 can be configured to indicate that the rebuild process is complete. However, in response to determining that there are more than one database record 118a, the process component 124 can be configured to subdivide the database records 118a. For example, as shown in the illustrated example in FIG. 3, the process component 124 can be configured to subdivide the database records 118a into pairs in a chronological order. For instance, the fourteen database records 118a can be divided into seven pairs such as one pair with S_1 and S_2 and another with S_3 and S_4. In other examples, the process component 124 can subdivide the database records 118a into groups of three, four, or any other suitable numbers and/or in other suitable orders.

The process component 124 can then be configured to merge the database records 118a in each of the pairs at the first level 128a. For instance, example database record S_1 can be merged with the example database record S_2 shown below by comparing start/end dates of these two database records:

| Employee | Regional Office | Start Date | End Date |
|---|---|---|---|
| John Smith | Chicago | Dec. 31, 2019 | (null) |

As shown above, the start date of S_2 is later than that of S_1, as such, the process component 124 can be configured to modify the end date of S_1 into the start date of S_2 to generate a table segment S_1_2 at the second level 128b as follows:

| Employee | Regional Office | Start Date | End Date |
|---|---|---|---|
| John Smith | Seattle | Jun. 4, 2019 | Dec. 31, 2019 |
| John Smith | Chicago | Dec. 31, 2019 | (null) |

Similarly, another example table segment S_3_4 can be generated based on corresponding example snapshots 112 as follows:

| Employee | Regional Office | Start Date | End Date |
|---|---|---|---|
| John Smith | Portland | Mar. 1, 2020 | Nov. 1, 2020 |
| John Smith | Seattle | Nov. 1, 2020 | (null) |

The process component 124 can then be configured to determine whether the table segments 118b at the second level 128b is more than one. In response to determining that there is only one table segment 118b at the second level 128b, the process component 124 can be configured to indicate that the restatement process is complete. On the other hand, as shown in the illustrated example, in response to determining that there are multiple table segments 118b at the second level 128b, the process component 124 can be configured to subdivide the table segments 118b into pairs and merge the individual pairs to generate table segments 118c at the third level 128c. For instance, table segment S_1_2 and S_3_4 can be merged by comparing the respective start/end dates to generate a table segment 118c S_1_4 as follows:

| Employee | Regional Office | Start Date | End Date |
|---|---|---|---|
| John Smith | Seattle | Jun. 4, 2019 | Dec. 31, 2019 |
| John Smith | Chicago | Dec. 31, 2019 | Mar. 1, 2020 |
| John Smith | Portland | Mar. 1, 2020 | Nov. 1, 2020 |
| John Smith | Seattle | Nov. 1, 2020 | (null) |

As shown above, the end date for "Chicago" was modified to Mar. 1, 2020 because the start date for "Portland" is later than the start date for "Chicago."

Though the examples shown above are related to snapshots in chronological order, in other examples, the snapshots may not be in chronological order and the merge operation may involve creating new database records for the table segment 118c. For instance, a further example table segment S_3_4 can be as follows:

| Employee | Regional Office | Start Date | End Date |
|---|---|---|---|
| John Smith | Portland | Nov. 1, 2019 | Nov. 30, 2019 |
| John Smith | Seattle | Nov. 1, 2020 | (null) |

Thus, comparing the start/end dates of the database records indicate that the start/end dates for "Portland" is inside that of "Seattle." As such, based on such determination, the process component 124 can be configured to generate the table segment 118c as follows:

| Employee | Regional Office | Start Date | End Date |
|---|---|---|---|
| John Smith | Seattle | Jun. 4, 2019 | Nov. 1, 2019 |
| John Smith | Portland | Nov. 1, 2019 | Nov. 30, 2019 |
| John Smith | Seattle | Nov. 30, 2019 | Dec. 31, 2019 |
| John Smith | Chicago | Dec. 31, 2019 | Nov. 1, 2020 |
| John Smith | Seattle | Nov. 1, 2020 | (null) |

In other examples, additional database records may be created when start/end dates of one overlap with another.

Upon generating the table segments 118c, the process component 124 can be configured to determine again whether there is more than one table segment 118c at the third level 128c. In response to determining that there are more than one table segments 118c, the process component 124 can be configured to repeat the merge and determining operations until only one overall table segment 118d is generated (e.g., S_1_14). In the illustrated example, the overall table segment 118d is at the fourth level 128d. In other examples, the logic tree 130 can include two, three, five, six, or any other suitable number of levels. As shown in FIG. 3, in certain implementations, the overall table segment 118d (i.e., S_1_14) can then be merged with an existing segment of the SCD table 110 in a fashion generally similar to the techniques discussed above to generate an updated SCD table 110'. In other implementations, the overall table segment 118d can be stored in the data store 108 (FIG. 2) as a new version of the SCD table 110.

The process component 124 of the table builder 120 can thus perform the creation and/or restatement process of the SCD table 110 faster than others that perform the restatement sequentially. By subdividing the snapshots/table segments and merge the pairs thereof, the table builder can be configured to process multiple snapshots/table segments generally concurrently. As such, multiple snapshots/table segments can be processed at the same time, and thus significantly shortening time of restating the SCD table. As such, compute power of one or more processor executing the table builder 120 can be more fully utilized than processing the snapshots/table segments one at a time. Thus, compute resources can be conserved to be used for other suitable processing. In addition, processing multiple snapshots/table segments at the same time can also reduce amount of network, storage, and other suitable types of resources consumed by the table builder executing on one or more servers.

Figure 4A:
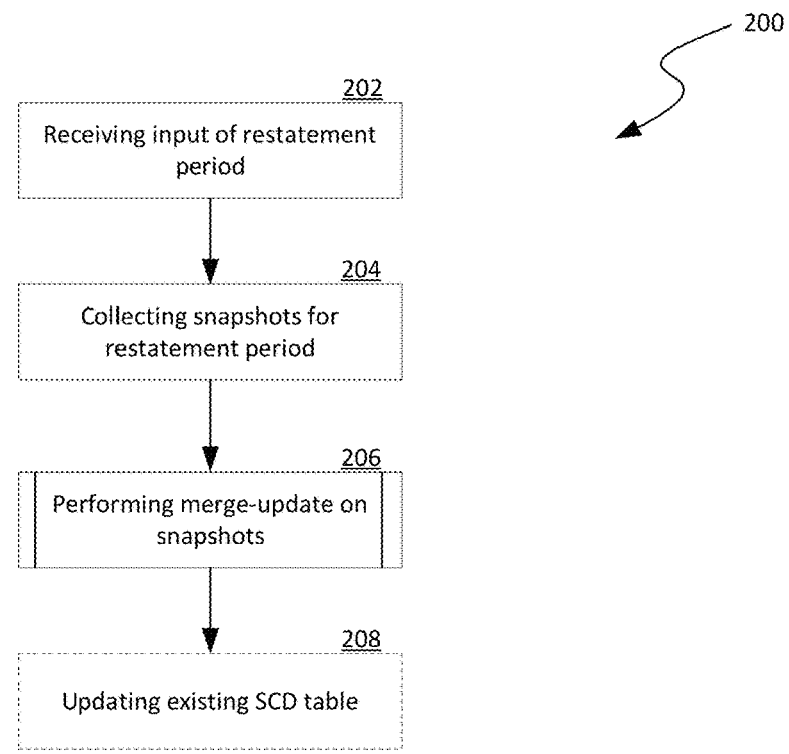
FIGS. 4A and 4B are flowcharts illustrating example processes of efficient creation and/or restatement of database tables in accordance with embodiments of the disclosed technology.
Figure 4B:
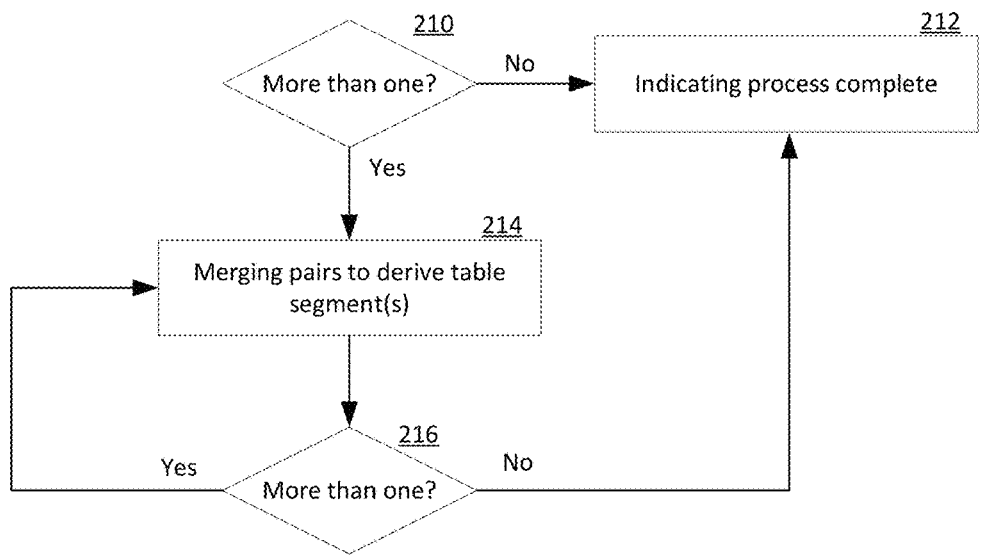

FIGS. 4A and 4B are flowcharts illustrating example processes of efficient creation and/or restatement of database tables in accordance with embodiments of the disclosed technology. Though the processes are described below in the context of the computing system 100 of FIG. 1, embodiments of the processes can also be implemented in other computing systems with additional and/or different components.

As shown in FIG. 4A, a process 200 can include receiving user input indicating a restatement period at stage 202. The restatement period can include a date/time period or other suitable delineation points. The process 200 can also include collecting snapshots for the restatement period at stage 204. In certain embodiments, collecting the snapshots can include retrieving stored snapshots from a data store. In other embodiments, collecting the snapshots can also include receiving corrected and/or new snapshots from a user, a server, or other suitable sources. The process 200 can then include performing merge-update on the collected snapshots at stage 206. Example operations of performing merge-update are described in more detail below with reference to FIG. 4B. The process 200 can then optionally include updating an existing SCD table using the merge-updated snapshots at stage 208.

As shown in FIG. 4B, the operations of performing merge-update can include a decision stage 210 to determine whether there are more than one snapshot or table segment. In response to determining that there is only one table segment, the operations proceed to indicating process complete at stage 212. Otherwise, the operations proceed to merging pairs of the snapshots/table segments to derive additional table segment(s). Examples of merging the snapshots/table segments are described above with reference to FIG. 3. The operations can then include another decision stage 216 to determine whether there is more than one derived table segment. In response to determining that there is only one table segment, the operations proceed to indicating process complete at stage 212. Otherwise, the operations revert to merging pairs of table segments at stage 214 until only one merged table segment is derived.

Figure 5:
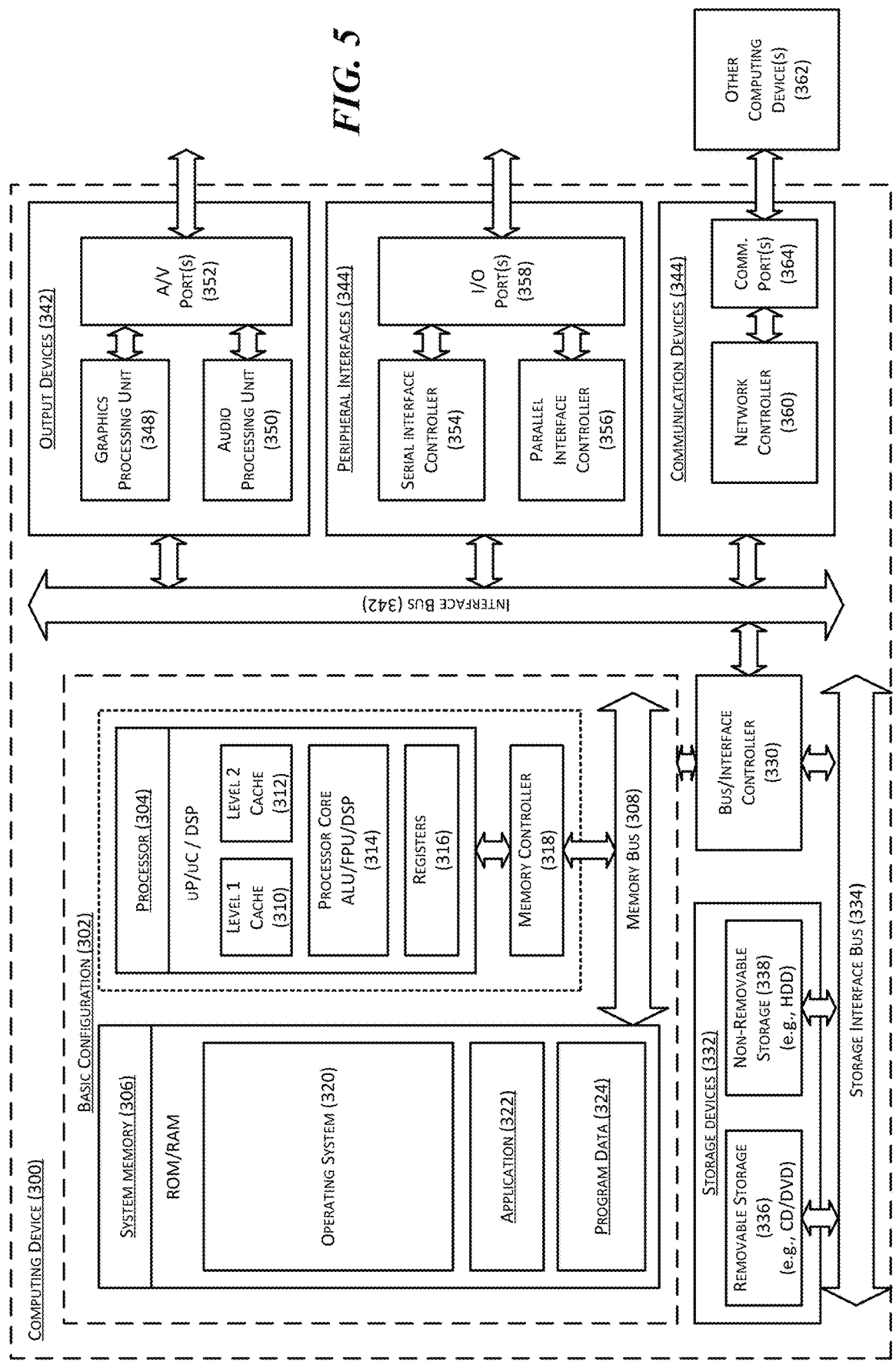
FIG. 5 is a computing device suitable for certain components of the computing system in FIG. 1.

FIG. 5 is a computing device 300 suitable for certain components of the computing system 100 in FIG. 1. For example, the computing device 300 can be suitable for the database servers 106, the table builder 120, or the client device 102 of FIG. 1. In a very basic configuration 302, the computing device 300 can include one or more processors 304 and a system memory 306. A memory bus 308 can be used for communicating between processor 304 and system memory 306.

Depending on the desired configuration, the processor 304 can be of any type including but not limited to a microprocessor ($\mu P$), a microcontroller ($\mu C$), a digital signal processor (DSP), or any combination thereof. The processor 304 can include one more level of caching, such as a level-one cache 310 and a level-two cache 312, a processor core 314, and registers 316. An example processor core 314 can include an arithmetic logic unit (ALU), a floating-point unit (FPU), a digital signal processing core (DSP Core), or any combination thereof. An example memory controller 318 can also be used with processor 304, or in some implementations memory controller 318 can be an internal part of processor 304.

Depending on the desired configuration, the system memory 306 can be of any type including but not limited to volatile memory (such as RAM), non-volatile memory (such as ROM, flash memory, etc.) or any combination thereof. The system memory 306 can include an operating system 320, one or more applications 322, and program data 324. This described basic configuration 302 is illustrated by those components within the inner dashed line.

The computing device 300 can have additional features or functionality, and additional interfaces to facilitate communications between basic configuration 302 and any other devices and interfaces. For example, a bus/interface controller 330 can be used to facilitate communications between the basic configuration 302 and one or more data storage devices 332 via a storage interface bus 334. The data storage devices 332 can be removable storage devices 336, non-removable storage devices 338, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media can include volatile and nonvolatile, removable and non-removable media implemented in any method or technology for storage of information, such as computer readable instructions, data structures, program modules, or other data. The term "computer readable storage media" or "computer readable storage device" excludes propagated signals and communication media.

The system memory 306, removable storage devices 336, and non-removable storage devices 338 are examples of computer readable storage media. Computer readable storage media include, but not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information, and which can be accessed by computing device 300. Any such computer readable storage media can be a part of computing device 300. The term "computer readable storage medium" excludes propagated signals and communication media.

The computing device 300 can also include an interface bus 340 for facilitating communication from various interface devices (e.g., output devices 342, peripheral interfaces 344, and communication devices 346) to the basic configuration 302 via bus/interface controller 330. Example output devices 342 include a graphics processing unit 348 and an audio processing unit 350, which can be configured to communicate to various external devices such as a display or speakers via one or more NV ports 352. Example peripheral interfaces 344 include a serial interface controller 354 or a parallel interface controller 356, which can be configured to communicate with external devices such as input devices (e.g., keyboard, mouse, pen, voice input device, touch input device, etc.) or other peripheral devices (e.g., printer, scanner, etc.) via one or more I/O ports 358. An example communication device 346 includes a network controller 360, which can be arranged to facilitate communications with one or more other computing devices 362 over a network communication link via one or more communication ports 364.

The network communication link can be one example of a communication media. Communication media can typically be embodied by computer readable instructions, data structures, program modules, or other data in a modulated data signal, such as a carrier wave or other transport mechanism, and can include any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), microwave, infrared (IR) and other wireless media. The term computer readable media as used herein can include both storage media and communication media.

The computing device 300 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. The computing device 300 can also be implemented as a personal computer including both laptop computer and non-laptop computer configurations.

From the foregoing, it will be appreciated that specific embodiments of the disclosure have been described herein for purposes of illustration, but that various modifications may be made without deviating from the disclosure. In addition, many of the elements of one embodiment may be combined with other embodiments in addition to or in lieu of the elements of the other embodiments. Accordingly, the technology is not limited except as by the appended claims.

We claim:

1. A method of rebuilding or restating at least a portion of a Slowly Changing Dimensions (SCD) table in a database at a computing device based on a set of snapshots, the method comprising:
   determining, with a processor of the computing device, whether the set of snapshots include more than two snapshots, each snapshot containing data representing a current value of a variable corresponding to a dimension in the table and a corresponding time when the current value is measured; and
   in response to determining that the set of snapshots includes more than two snapshots, grouping the snapshots in the set into one or more pairs of snapshots;

generally concurrently merging the one or more pairs of the snapshots to generate one or more table segments individually corresponding to one of the one or more grouped pairs of snapshots in the set, the one or more table segments individually including one or more database records having corresponding current values of the one or more pairs of snapshots and a start timepoint and an end timepoint based on the corresponding time when the current values are measured in the one or more pairs of snapshots;

determining whether only one of the one or more generated table segments is present; and in response to determining that only one generated table segment is present, indicating rebuilding of the at least a portion of the table based on the set of snapshots is completed; and storing the generated table segment in a datastore as the at least a portion of the SCD table, thereby reducing processing time of rebuilding the SCD table and conserving compute resources at the processor.

2. The method of claim 1, further comprising:
in response to determining that more than one table segments are present,
grouping the generated table segments into one or more pairs of table segments; and
generally concurrently merging the one or more pairs of the table segments to generate one or more further table segments individually corresponding to a pair of the table segments.

3. The method of claim 2 wherein generally concurrently merging the one or more pairs of the table segments includes:
determining whether the value of the variable has changed in a pair of the table segments; and
in response to determining that the value of the variable has not changed in the pair of the table segments, combining the pair of the table segments into another table segment containing a database record having:
the value in the dimension in the table corresponding to the variable;
a start timepoint set to an earliest timepoint in the one pair of the table segments; and
an end timepoint set to a null value indicating a value of the end timepoint is unknown.

4. The method of claim 2 wherein generally concurrently merging the one or more pairs of the table segments includes:
determining whether the value of the variable has changed in a pair of the table segments; and
in response to determining that the value of the variable has changed in the pair of the table segments from a first value measured at a first timepoint to a second value measured at a second timepoint later than the first timepoint, combining the pair of the table segments into another table segment containing:
a first database record containing:
the first value in the dimension in the table corresponding to the variable;
a first start timepoint set to the first timepoint; and
a first end timepoint set to the second timepoint; and
a second database record containing:
the second value in the dimension in the table corresponding to the variable;
a second start timepoint set to the second timepoint; and
a second end timepoint set to a null value indicating a value of the end timepoint is unknown.

5. The method of claim 1, further comprising:
in response to determining that more than one generated table segments are present,
grouping the generated table segments into one or more pairs of table segments;
generally concurrently merging the one or more pairs of the table segments to generate one or more additional table segments each corresponding to a pair of the table segments;
determining whether only one additional table segment is present; and
in response to determining that more than one additional table segment is present, repeating the grouping and generally concurrently merging operations on the additional table segments until only one overall table segment is generated.

6. The method of claim 1, further comprising:
in response to determining that more than one generated table segments are present,
grouping the one or more generated table segments into one or more pairs of table segments;
generally concurrently merging the one or more pairs of the table segments to generate one or more additional table segments each corresponding to a pair of the table segments;
determining whether only one additional table segment is present; and
in response to determining that only one additional table segment is present,
indicating generation of the at least a portion of the table based on the set of snapshots is completed; and
storing the generated table segment in the datastore as the at least a portion of the table.

7. The method of claim 1 wherein grouping the snapshots in the set into one or more pairs of snapshots includes grouping the snapshots in the set into one or more pairs of snapshots in a chronological order based on timepoints at which the values of the variable were measured.

8. The method of claim 1 wherein generally concurrently merging the one or more pairs of the snapshots includes:
determining, with the processor of the computing device, whether the value of the variable has changed for one pair of the snapshots; and
in response to determining that the value of the variable has not changed for the one pair of the snapshots, generating a database record in the table segment containing:
the value in the dimension in the table corresponding to the variable;
a start timepoint set to an earliest timepoint in the one pair of the snapshots; and
an end timepoint set to a null value indicating a value of the end timepoint is unknown.

9. The method of claim 1 wherein generally concurrently merging the one or more pairs of the snapshots includes:
determining, with the processor of the computing device, whether the value of the variable has changed for one pair of the snapshots; and
in response to determining that the value of the variable has changed for the one pair of the snapshots from a first value measured at a first timepoint to a second value measured at a second timepoint later than the first timepoint, generating in the table segment:
a first database record containing:
the first value in the dimension in the table corresponding to the variable;
a first start timepoint set to the first timepoint; and
a first end timepoint set to the second timepoint; and
a second database record containing:
the second value in the dimension in the table corresponding to the variable;
a second start timepoint set to the second timepoint; and
a second end timepoint set to a null value indicating a value of the end timepoint is unknown.

10. A computing device for rebuilding or restating at least a portion of a Slowly Changing Dimensions (SCD) table in a database based on a set of snapshots, the computing device comprising:
a processor;
a memory containing instructions executable by the processor to cause the computing device to:
collect the snapshots in the set into multiple pairs of snapshots, the snapshots individually containing a current value of a variable corresponding to a dimension in the table and a corresponding time at when the current value is measured;
concurrently generate multiple first table segments individually from a corresponding one of the multiple pairs of snapshots in the set, the first table segments individually including one or more database records having corresponding current values of the snapshots and a start timepoint and an end timepoint based on the corresponding time when the current values are measured;
group the generated multiple first table segments into multiple pairs of the first table segments;
concurrently merge the multiple pairs of first table segments individually into second table segments individually including one or more additional database records having the current values in the first table segments and another start timepoint and another end timepoint based on the start and end timepoints in the first table segments;
repeatedly group and concurrently merge until only one table segment is present; and
subsequently, store the one table segment in a datastore as the at least a portion of the SCD table, thereby reducing processing time of rebuilding the SCD table and conserving compute resources at the processor.

11. The computing device of claim 10 wherein to collect the snapshots in the set into one or more pairs of snapshots includes to collect the snapshots in the set into one or more pairs of snapshots in a chronological order based on timepoints when the values of the variable were measured.

12. The computing device of claim 10 wherein to concurrently generate multiple first table segments includes to:
determine, with the processor of the computing device, whether the value of the variable has changed for one pair of the snapshots; and
in response to determining that the value of the variable has not changed for the one pair of the snapshots, generate a database record in one of the first table segments containing:
the value in the dimension in the table corresponding to the variable;
a start timepoint set to an earliest timepoint in the one pair of the snapshots; and
an end timepoint set to a null value indicating a value of the end timepoint is unknown.

13. The computing device of claim 10 wherein to concurrently generate multiple first table segments includes to:
determine, with the processor of the computing device, whether the value of the variable has changed for one pair of the snapshots; and
in response to determining that the value of the variable has changed for the one pair of the snapshots from a first value measured at a first timepoint to a second value measured at a second timepoint later than the first timepoint, generate in one of the first table segments:
a first database record containing:
the first value in the dimension in the table corresponding to the variable;
a first start timepoint set to the first timepoint; and
a first end timepoint set to the second timepoint; and
a second database record containing:
the second value in the dimension in the table corresponding to the variable;
a second start timepoint set to the second timepoint; and
a second end timepoint set to a null value indicating a value of the end timepoint is unknown.

14. The computing device of claim 10 wherein to concurrently merge the multiple pairs of first table segments includes to:
determine whether the value of the variable has changed in a pair of the first table segments; and
in response to determining that the value of the variable has not changed in the pair of the first table segments, combine the pair of the first table segments into one of the second table segments containing a database record having:
the value in the dimension in the table corresponding to the variable;
a start timepoint set to an earliest timepoint in the one pair of the table segments; and
an end timepoint set to a null value indicating a value of the end timepoint is unknown.

15. The computing device of claim 10 wherein to concurrently merge the multiple pairs of first table segments includes to:
determine whether the value of the variable has changed in a pair of the first table segments; and
in response to determining that the value of the variable has changed in the pair of the first table segments from a first value measured at a first timepoint to a second value measured at a second timepoint later than the first timepoint, combine the pair of the first table segments into one of the second table segments containing:
a first database record containing:
the first value in the dimension in the table corresponding to the variable;
a first start timepoint set to the first timepoint; and
a first end timepoint set to the second timepoint; and
a second database record containing:
the second value in the dimension in the table corresponding to the variable;
a second start timepoint set to the second timepoint; and
a second end timepoint set to a null value indicating a value of the end timepoint is unknown.

16. A method of rebuilding or restating at least a portion of a Slowly Changing Dimensions (SCD) table in a database at a computing device based on a set of snapshots, the method comprising:

collecting the snapshots in the set into multiple pairs of snapshots;

concurrently generating multiple first table segments individually from a corresponding one of the multiple pairs of snapshots in the set, the first table segments individually including one or more database records having corresponding current values of the snapshots and a start timepoint and an end timepoint based on corresponding time when the current values are measured;

grouping the generated multiple first table segments into multiple pairs of the first table segments;

concurrently merging the multiple pairs of first table segments individually into second table segments individually including one or more additional database records having current values in the first table segments and another start timepoint and another end timepoint based on the start and end timepoints in the first table segments;

repeating the grouping and concurrently merging operations until only one table segment is present; and subsequently, storing the one table segment in a datastore as the at least a portion of the SCD table, thereby reducing processing time of rebuilding the SCD table and conserving compute resources at the computing device.

17. The method of claim 16 wherein concurrently generating multiple first table segments includes:

determining, with the computing device, whether a value of a variable has changed for one pair of the snapshots; and in response to determining that the value of the variable has not changed for the one pair of the snapshots, generating a database record in one of the first table segments containing:
- a value in the dimension in the table corresponding to the variable;
- a start timepoint set to an earliest timepoint in the one pair of the snapshots; and
- an end timepoint set to a null value indicating a value of the end timepoint is unknown.

18. The method of claim 16 wherein concurrently generating multiple first table segments includes:

determining, with the computing device, whether a value of a variable has changed for one pair of the snapshots; and in response to determining that the value of the variable has changed for the one pair of the snapshots from a first value measured at a first timepoint to a second value measured at a second timepoint later than the first timepoint, generating in one of the first table segments:
- a first database record containing:
  - a first value in the dimension in the table corresponding to the variable;
  - a first start timepoint set to the first timepoint; and
  - a first end timepoint set to the second timepoint; and
- a second database record containing:
  - a second value in the dimension in the table corresponding to the variable;
  - a second start timepoint set to the second timepoint; and
  - a second end timepoint set to a null value indicating a value of the end timepoint is unknown.

19. The method of claim 16 wherein concurrently merging the multiple pairs of first table segments includes:

determining whether the value of the variable has changed in a pair of the first table segments; and in response to determining that the value of the variable has not changed in the pair of the first table segments, combining the pair of the first table segments into one of the second table segments containing a database record having:
- the value in the dimension in the table corresponding to the variable;
- a start timepoint set to an earliest timepoint in the one pair of the table segments; and
- an end timepoint set to a null value indicating a value of the end timepoint is unknown.

20. The method of claim 16 wherein concurrently merging the multiple pairs of first table segments includes:

determining whether the value of the variable has changed in a pair of the first table segments; and in response to determining that the value of the variable has changed in the pair of the first table segments from a first value measured at a first timepoint to a second value measured at a second timepoint later than the first timepoint, combining the pair of the first table segments into one of the second table segments containing:
- a first database record containing:
  - the first value in the dimension in the table corresponding to the variable;
  - a first start timepoint set to the first timepoint; and
  - a first end timepoint set to the second timepoint; and
- a second database record containing:
  - the second value in the dimension in the table corresponding to the variable;
  - a second start timepoint set to the second timepoint; and
  - a second end timepoint set to a null value indicating a value of the end timepoint is unknown.

* * * * *